(12) United States Patent
Kilbreath et al.

(10) Patent No.: US 10,837,344 B2
(45) Date of Patent: Nov. 17, 2020

(54) CONVERTER V-BAND CLAMP ANTI-ROTATION AND ASSEMBLY AID

(71) Applicant: GM Global Technology Operations LLC, Detroit, MI (US)

(72) Inventors: Randell W. Kilbreath, Grand Blanc, MI (US); Marc L. Friedrich, Rochester Hills, MI (US); Steve Smith, Owosso, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 615 days.

(21) Appl. No.: 15/702,956

(22) Filed: Sep. 13, 2017

(65) Prior Publication Data
US 2019/0078492 A1 Mar. 14, 2019

(51) Int. Cl.
*F01N 3/24* (2006.01)
*F01N 5/00* (2006.01)
*F01N 13/18* (2010.01)
*F02B 37/00* (2006.01)

(52) U.S. Cl.
CPC ........... *F01N 13/1805* (2013.01); *F01N 3/24* (2013.01); *F01N 5/00* (2013.01); *F01N 13/1844* (2013.01); *F01N 13/1855* (2013.01); *F01N 2340/06* (2013.01); *F02B 37/00* (2013.01); *Y02T 10/144* (2013.01)

(58) Field of Classification Search
CPC .......... F01N 3/24; F01N 5/00; F01N 13/1805; F01N 13/1844; F01N 13/1855; F01N 2340/06; F02B 37/00; Y02T 10/144
See application file for complete search history.

(56) References Cited

U.S. PATENT DOCUMENTS

| | | | |
|---|---|---|---|
| 5,782,499 A * | 7/1998 | Gfrerer | F16L 23/08 285/23 |
| 7,458,619 B2 * | 12/2008 | Cassel | F01N 13/1805 285/420 |
| 2005/0099001 A1 | 5/2005 | Cassel et al. | |
| 2011/0277466 A1 * | 11/2011 | Danielewicz | F01N 13/1805 60/598 |

OTHER PUBLICATIONS

Chinese Office Action dated Aug. 19, 2020 (corresponding to CN 201811000726.X).

* cited by examiner

*Primary Examiner* — Audrey K Bradley
(74) *Attorney, Agent, or Firm* — Harness, Dickey & Pierce, P.L.C.

(57) ABSTRACT

An anti-rotation and assembly aid clamp for use in coupling a turbocharger and a catalytic converter. The clamp can include a ring body configured to circumferentially clamp the outlet flange to the inlet flange, a torque application device configured to apply a force about the ring body, and an anti-rotation assembly device configured to be engageable with a first coupling post extending from the turbocharger and a second coupling post extending from the convert to exert a clamping force urging the outlet flange toward the inlet flange.

18 Claims, 6 Drawing Sheets

CONVERTER V-BAND CLAMP ANTI-ROTATION AND ASSEMBLY AID

FIELD

The present disclosure relates to a V-band clamp and, more particularly, relates to an anti-rotation and assembly aid V-band clamp for use in a converter assembly.

BACKGROUND

This section provides background information related to the present disclosure which is not necessarily prior art.

Turbochargers have become an increasingly common component in automotive power train systems. As is well known, a turbocharger is useful in increasing engine efficiency by using a compressor positioned in the exhaust system and driven by exhaust gases to force air into an internal combustion engine. Turbochargers are often used in combination with other components commonly used in modern vehicles, such as catalytic converters. In some vehicles, a turbocharger can be joined to a catalytic converter during assembly of the vehicle.

Commonly, the turbocharger includes an exhaust flange, downstream of the compressor, that is directly joined and sealingly engaged to an inlet flange of the converter to route hot exhaust gases from the turbocharger downstream to the converter. This coupling arrangement is often completed via a V-band that surrounds and generally clamps a raised portion of the exhaust flange of the turbocharger with a corresponding raised portion of the inlet flange of the converter.

Figure 1:
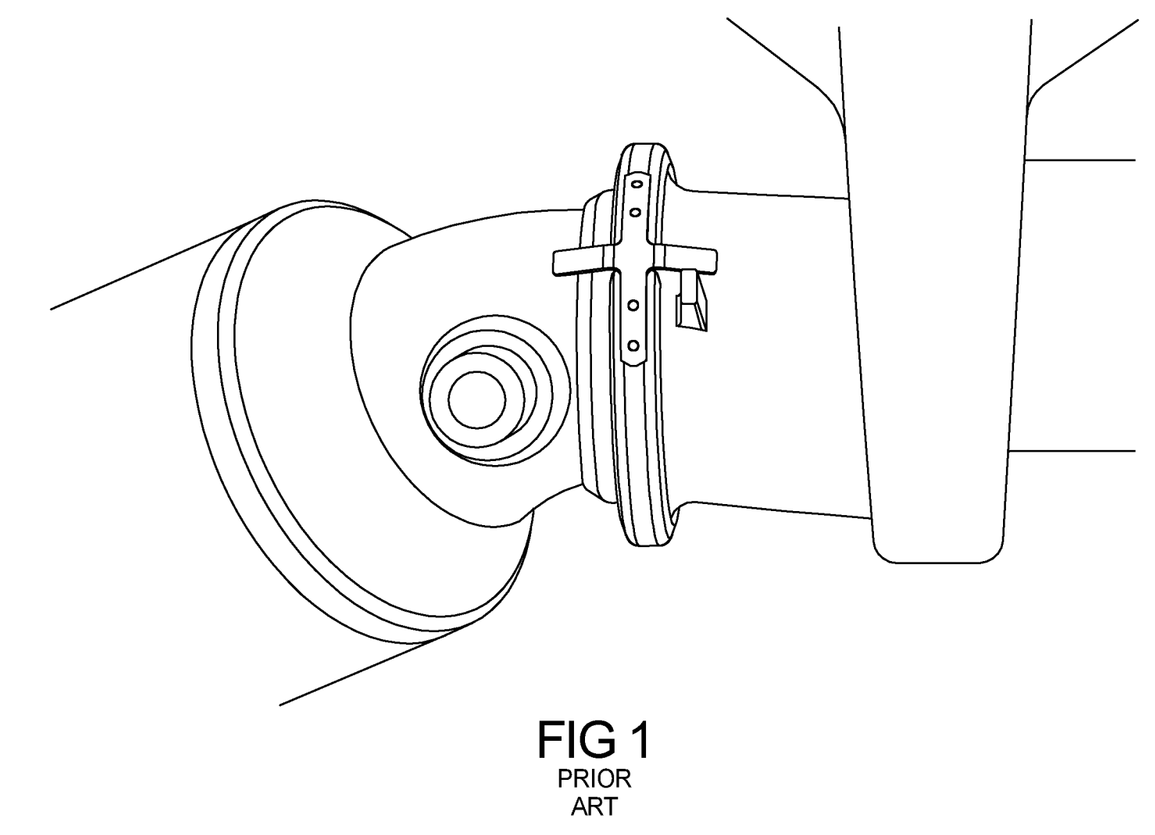
FIG. 1 is a perspective view of an exhaust system of an automotive power train system having a turbocharger, a converter, and a clamp according to the prior art.

However, in modern vehicles, turbochargers and converters are not easily joined due to many reasons. For instance, in some applications, the turbocharger and the converter are not coaxially aligned and, therefore, it can become difficult to quickly achieve a reliable and effective mating surface between the outlet flange of the turbocharger and the inlet flange of the converter as illustrated in FIG. 1. Moreover, achieving this reliable and effective mating surface can become more difficult due to the limited available space.

Accordingly, there is a need in the relevant art to provide a simple and convenient device for reliably and effectively mating the outlet flange of the turbocharger to the inlet flange of the converter. Moreover, there is a need in the relevant art to provide a clamp device configured to aid in drawing the turbocharger and converter together to join and sealingly engage the outlet flange of the turbocharger to the inlet flange of the converter. Finally, there is a need in the relevant art to overcome the deficiencies of the prior art.

SUMMARY

This section provides a general summary of the disclosure, and is not a comprehensive disclosure of its full scope or all of its features.

According to the principles of the present teachings, an anti-rotation and assembly aid clamp for use in coupling a turbocharger and a catalytic converter is provided having advantageous construction and method of use. The clamp can include a ring body configured to circumferentially clamp the outlet flange to the inlet flange, a torque application device configured to apply a force about the ring body, and an anti-rotation assembly device configured to be engageable with a first coupling post extending from the turbocharger and a second coupling post extending from the convert to exert a clamping force urging the outlet flange toward the inlet flange.

The present teachings further provide an exhaust assembly having a turbocharger having an outlet flange, the outlet flange having a first coupling post; a catalytic converter having an inlet flange, the inlet flange having a second coupling post, the inlet flange being sized and shaped to be complementary to the outlet flange; and a clamp circumferentially clamping the outlet flange to the inlet flange. The clamp can include a torque application device and an anti-rotation assembly device, where the anti-rotation assembly device can be configured to engage the first coupling post and the second coupling post and exert a clamping force urging the outlet flange toward the inlet flange.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
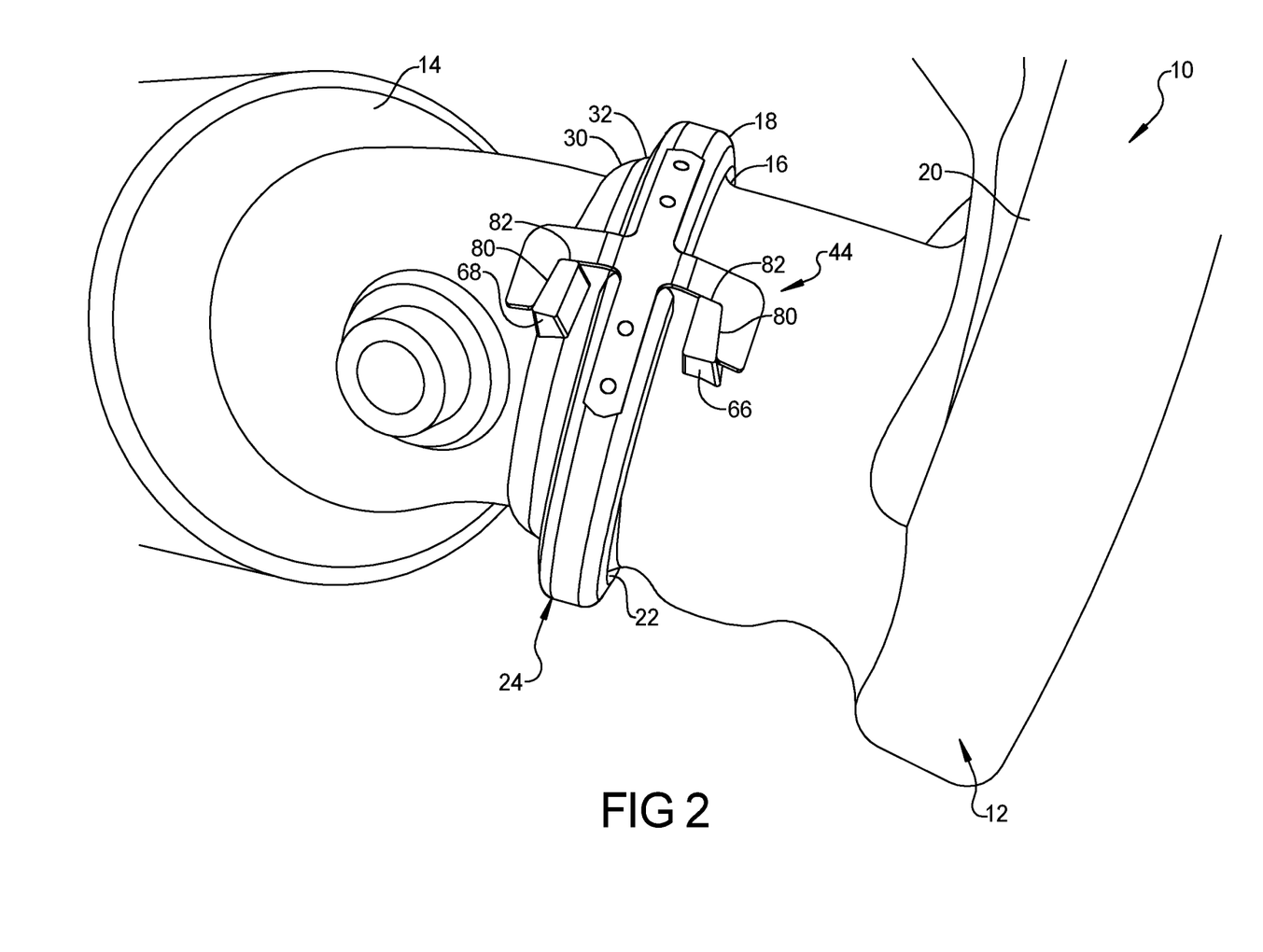
FIG. 2 is a perspective view of an exhaust system of an automotive power train system having a turbocharger, a converter, and a V-band clamp according to the principles of the present disclosure.
Figure 3:
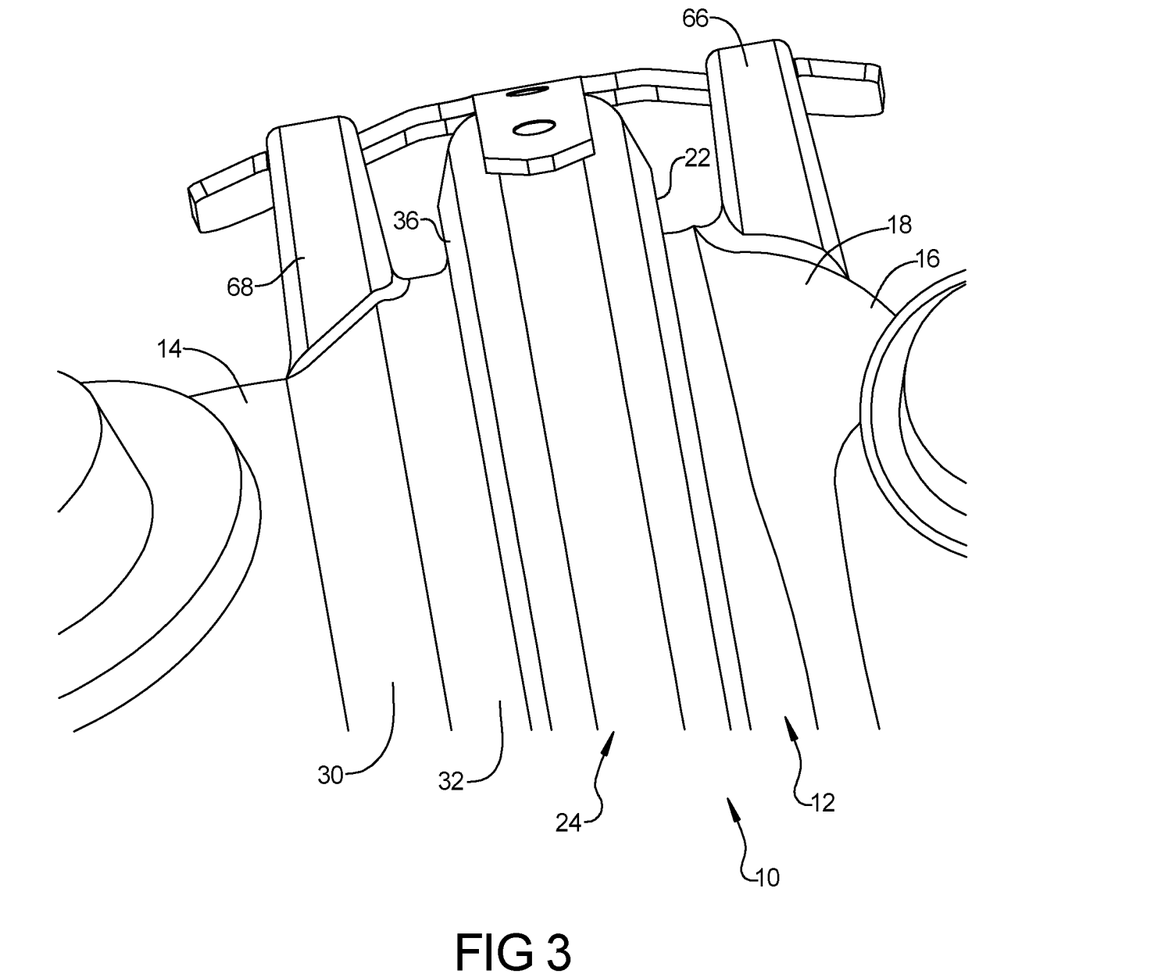
FIG. 3 is an enlarged side view of the V-band clamp and associated tab features of the outlet flange of the turbocharger and the inlet flange of the converter according to the principles of the present disclosure.
Figure 4:
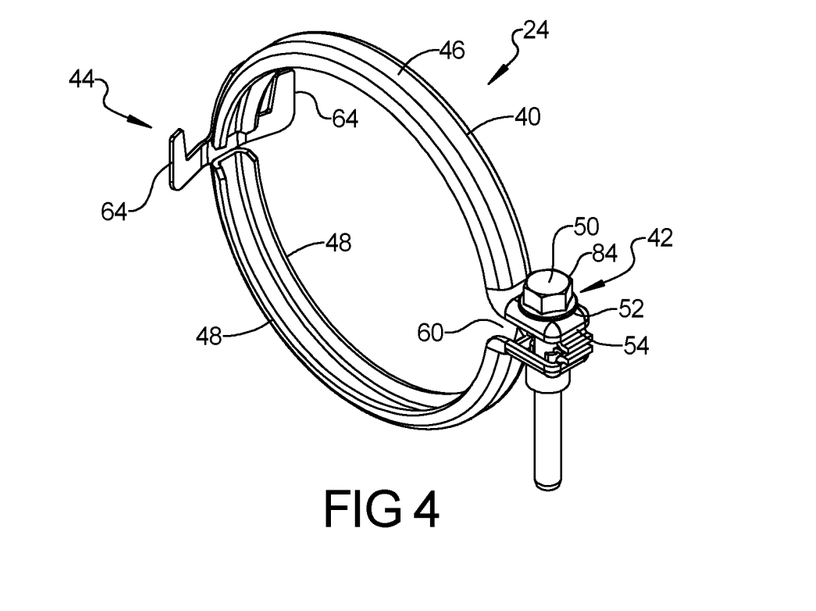
FIG. 4 is a first perspective view of the V-band clamp.

An exhaust assembly 10 is illustrated in FIGS. 2-3 according to the principles of the present disclosure. The exhaust assembly 10 may include a turbocharger 12 and a catalytic converter 14. The turbocharger 12 can comprise a turbine wheel provided within a turbine chamber of the turbine section and a compressor wheel within a compressor chamber of the compressor section. The turbine wheel and the compressor wheel can be connected to one another by a shaft. Exhaust gases pass through the exhaust passage and thus the turbine section can drive the turbine wheel which in turn drives the shaft and compressor wheel. As the compressor wheel is turned, the intake air from an air inlet is compressed and delivered to the air outlet so that the compressed air is delivered through the air intake passage through the throttle valve and intake manifold.

The exhaust gases of the turbocharger 12 can exit the exhaust passage through an outlet port 16 of an outlet flange 18 positioned downstream of the turbine wheel. The outlet flange 18 of turbocharger 12 can be integrally formed with a turbocharger housing 20. In some embodiments, the outlet flange 18 is generally cylindrical and comprises a raised rim portion 22 circumferentially extending about the outlet port 16 of the outlet flange 18. The raised rim portion 22 can define a predetermined cross-sectional shape that is complementary with a V-band clamp 24, which will be described in detail herein.

Similarly, the exhaust gauges of the turbocharger 12 exiting outlet port 16 can pass into an inlet port 30 of inlet flange 32 of converter 14. The inlet flange 32 of converter 14 can be integrally formed with a converter housing 34. In some embodiments, the inlet flange 32 is generally cylindrical and comprises a raised rim portion 36 circumferentially extending about the inlet port 30 of the inlet flange 32. The raised rim portion 36, like raised rim portion 22, can define a predetermined cross-sectional shape that is complementary with the V-band clamp 24.

With particular reference to FIGS. 4-9, V-band clamp 24 is illustrated having an advantageous construction and method of use. In some embodiments, V-band clamp 24 can comprise a generally cylindrical ring body 40 having a torque application device 42 and an anti-rotation assembly device 44 for circumferentially clamping and coupling outlet flange 18 and inlet flange 32. In particular, in some embodiments, ring body 40 can comprise a continuous or multi-piece body defining a V or U-shaped cross-section. Ring body 40 can include a main portion 46 having a pair of inwardly-turned edges 48 that together define the V or U-shaped cross-section. In some embodiments, this cross-sectional shape is complementary to the combined shape of raised rim portion 22 of outlet flange 18 of turbocharger 12 and raised rim portion 36 of inlet flange 32 of converter 14. In some embodiments, ring body 40 is sized to closely conform to the combined cross-section of raised rim portions 22, 36 to provide a clamping and/or compressing force upon turbocharger 12 and converter 14 to ensure a reliable and sealing coupling connection between turbocharger 12 and converter 14. To this end, the outlet flange 18 of turbocharger 12 can define a face surface that is complementary to a corresponding face surface of inlet flange 32 of converter 14.

In some embodiments, torque application device 42 can comprise a threaded fastener 50 extending through a first aperture 52 formed in a first outwardly turned end 54 of ring body 40 and being threadedly engaged within an aperture 56 formed in a second outwardly turned end 58 of ring body 40. A gap 60 can be formed between first outwardly turned end 54 and second outwardly turned end 58 of ring body 40 to permit sufficient, non-binding application of torque to ring body 40, thereby urging ring body 40 to form a smaller inner diameter and exert a clamping force upon outlet flange 18 and inlet flange 32. This clamping force and the defined cross-sectional shape of V-band clamp 24 is sufficient to clampingly retain outlet flange 18 in coupled engagement with inlet flange 32 to define a reliable, sealing connection. It should be understood that torque application device 42 can include any device or system suitable for applying a torque to ring body 40, such as, but not limited to, worm clamps, spring clamps, over-center clamps, thumb clamps, and the like.

In some embodiments, anti-rotation assembly device 44 can comprise a pair of anti-rotation tabs 64 that are sized and shaped to engage and retain corresponding raised coupling posts 66, 68 extending from outlet flange 18 and inlet flange 32, respectively (see FIGS. 1-3). In some embodiments, the pair of anti-rotation tabs 64 is formed as a pair of wing members extending generally laterally from ring body 40. In other words, in some embodiments, each of the tabs 64 extends from main portion 46 and generally co-planar therewith. It should be appreciated, as illustrated in FIG. 3, that each of the tabs 64 may include an inwardly-directed curvature to facilitate and/or encourage engagement with coupling posts 66, 68. In some embodiments, each of the pair of anti-rotation tabs 64 can comprise an orthogonal portion 70 extending outwardly from main portion 46 (in an orthogonal direction relative to a centerline of main portion 46 of ring body 40) and a turned portion 72 disposed at a distal end of orthogonal portion 70. In some embodiments, turned portion 72 can be generally parallel with the centerline of main portion 46 of ring body 40. More particularly, turned portion 72 can comprise an angled edge 74 extending along an inward side of turned portion 72 terminating at a retaining edge 76 of the orthogonal portion 70. The combination of angled edge 74 and retaining edge 76 is adapted and configured to be complementary to an angled side 80 and support side 82 of each of the coupling posts 66, 68 of the outlet flange 18 and the inlet flange 32. In this way, the angled edge 74 of each tab 64 can engage the angled side 80 of coupling posts 66, 68 and the complementary angled engagement can thus cammingly draw the outlet flange 18 and inlet flange 32 together into sealing engagement. It should be understood, however, that in some embodiments only one of coupling posts 66, 68 need include angled side 80. Accordingly, in such embodiments, only one of tabs 64 need include angled edge 74.

It should be noted that, in some embodiments, tabs 64 are directly toward the head portion 84 of torque application device 42 such that the weight and/or pressing force of a torque gun or other installation tool exerts a rotational force on V-band clamp 24 thereby urging V-band clamp 24 to rotate in such a direction that angled edge 74 slides along angled side 80 of coupling post 66, 68 urging outlet flange 18 and inlet flange 32 together until retaining edge 76 contacts corresponding support side 82 of coupling post 66, 68. This arrangement provides both a joining force to draw and hold outlet flange 18 and inlet flange 32 together and further a holding force ensuring that V-band clamp 24 remaining in position during tightening of torque application device 42.

Figure 5:
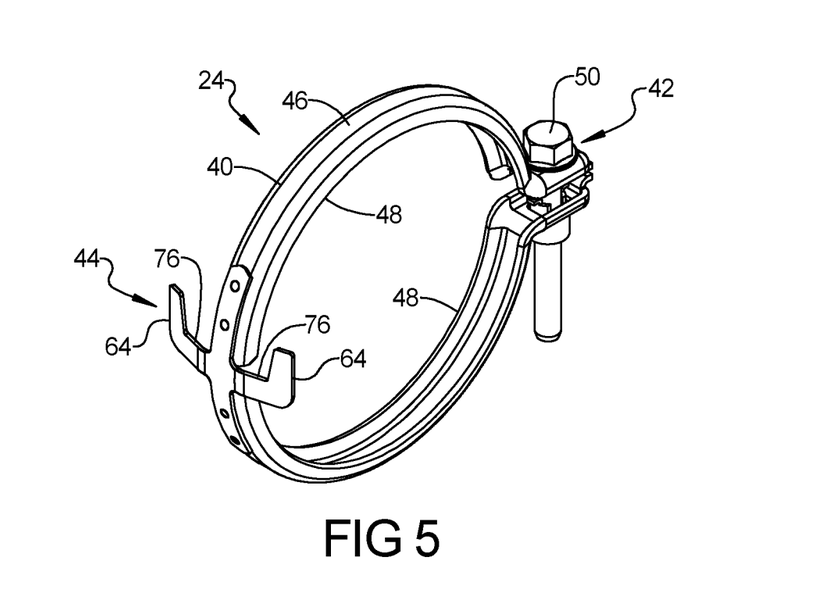
FIG. 5 is a second perspective view of the V-band clamp.
Figure 6:
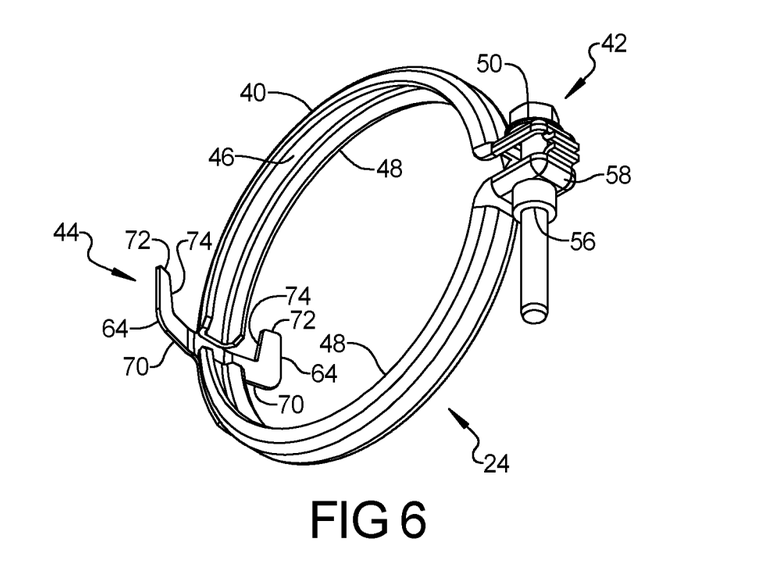
FIG. 6 is a third perspective view of the V-band clamp.
Figure 7:
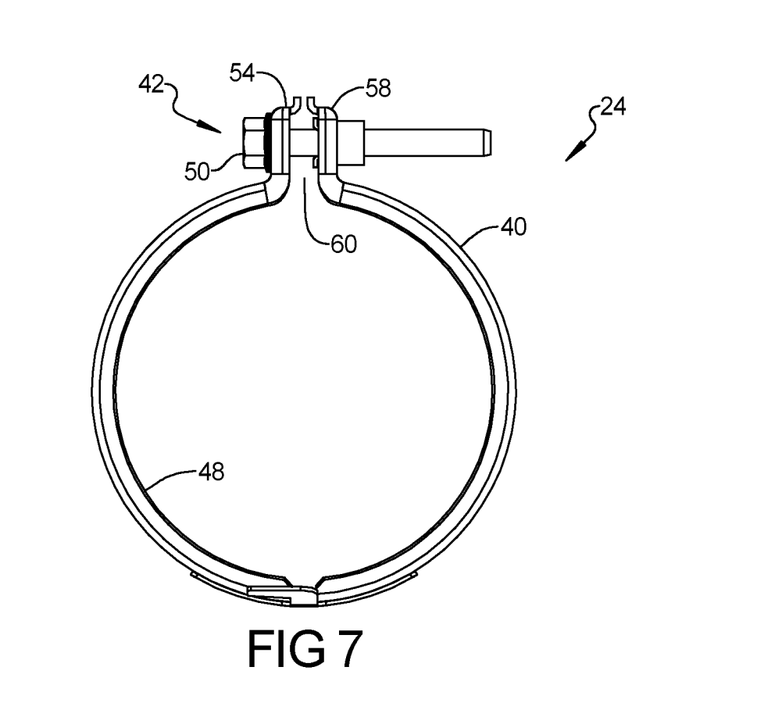
FIG. 7 is a front view of the V-band clamp.
Figure 8:
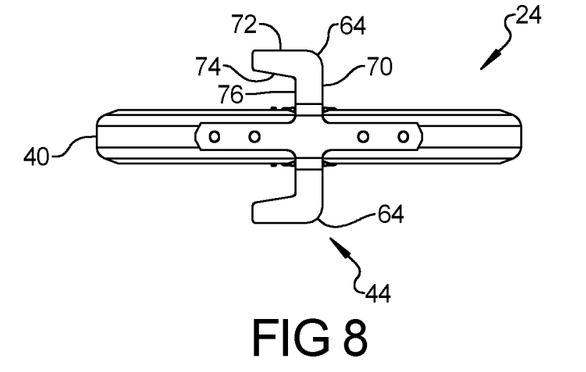
FIG. 8 is a bottom view of the V-band clamp.
Figure 9:
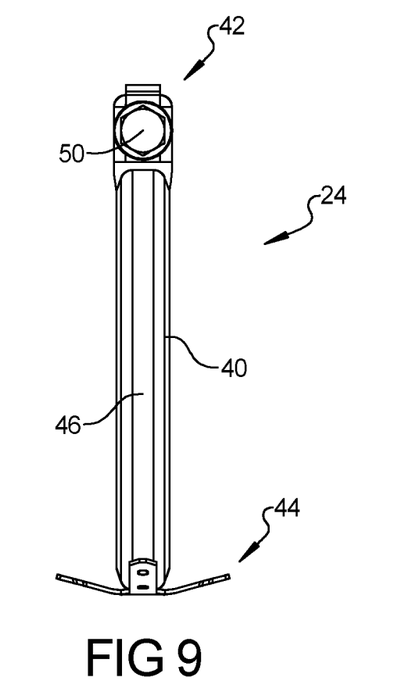
FIG. 9 is a side view of the V-band clamp.

In some embodiments, anti-rotation assembly device 44 can comprise a separately formed member that is fastened to ring body 40, such as via one or more rivets or fasteners, as illustrated in FIGS. 5 and 8. However, as indicated herein, it should be understood that V-band clamp 24 can be configured as a unitary member being stamped, for instance, from a single member. It should be understood that the particular size, shape, and cross-sectional configuration can vary without departing from the principles of the present disclosure.

According to the principles of the present disclosure, the clamp 24 provides a more robust sealing surface compared to conventional solutions in that the tabs 64 exerts an aligning and closing force as torque application device 42 is actuated, thereby closing clamp 24. This serves to enhance alignment of the turbocharger and converter while simultaneously reducing cycle time by ensure proper retention of clamp 24 during installation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust assembly comprising:
a turbocharger having an outlet flange, the outlet flange having a first coupling post;
a catalytic converter having an inlet flange, the inlet flange having a second coupling post, the inlet flange being sized and shaped to be complementary to the outlet flange; and
a clamp circumferentially clamping the outlet flange to the inlet flange, the clamp having a torque application device and an anti-rotation assembly device, the anti-rotation assembly device configured to engage the first coupling post and the second coupling post and exert a clamping force urging the outlet flange toward the inlet flange.

2. The exhaust assembly according to claim 1 wherein at least one of the coupling posts comprises an angled side and the anti-rotation assembly device comprises a pair of tabs, at least one of the pair of tabs comprises an angled edge configured to engage the angled side of the at least one coupling post to urge the outlet flange toward the inlet flange.

3. The exhaust assembly according to claim 1 wherein each of the first and second coupling posts comprises an angled side and the anti-rotation assembly device comprises a pair of tabs each comprising an angled edge configured to engage the angled side of the corresponding coupling post to urge the outlet flange toward the inlet flange.

4. The exhaust assembly according to claim 1 wherein the anti-rotation assembly device is configured such that applied force against the torque application device results in rotation of the clamp such that the anti-rotation assembly device urges the outlet flange toward the inlet flange.

5. The exhaust assembly according to claim 4 wherein each of the first and second coupling posts comprises an angled side and the anti-rotation assembly device comprises a pair of tabs each comprising an angled edge configured to engage the angled side of the corresponding coupling post to urge the outlet flange toward the inlet flange in response to applied force against the torque application device.

6. The exhaust assembly according to claim 1 wherein the outlet flange has a raised-rim extending circumferentially about the outlet flange and the inlet flange has a raised-rim extending circumferentially about the inlet flange, the clamp generally surrounding the raised-rim of the outlet flange and the raised-rim of the inlet flange to clampingly retain the outlet flange in coupled engagement with the inlet flange.

7. The exhaust assembly according to claim 6 wherein the clamp is a V-band clamp having a main body portion and a pair of inwardly-turned edges together defining a generally V-shaped cross-section.

8. The exhaust assembly according to claim 7 wherein the V-shaped cross-section is complementary to a cross-section of the raised-rims of the outlet flange and the inlet flange.

9. An anti-rotation and assembly aid clamp for use in coupling a turbocharger and a catalytic converter, the turbocharger having an outlet flange with a raised-rim and a first coupling post, the catalytic converter having an inlet flange with a raised-rim and a second coupling post, the inlet flange being sized and shaped to be complementary to the outlet flange, the clamp comprising:
- a ring body configured to circumferentially clamp the outlet flange to the inlet flange;
- a torque application device configured to apply a force about the ring body; and
- an anti-rotation assembly device configured to be engageable with the first coupling post and the second coupling post and exert a clamping force urging the outlet flange toward the inlet flange.

10. The clamp according to claim 9 wherein at least one of the coupling posts comprises an angled side and the anti-rotation assembly device comprises a pair of tabs, at least one of the pair of tabs comprises an angled edge configured to engage the angled side of the at least one coupling post to urge the outlet flange toward the inlet flange.

11. The clamp according to claim 9 wherein each of the first and second coupling posts comprises an angled side and the anti-rotation assembly device comprises a pair of tabs each comprising an angled edge configured to engage the angled side of the corresponding coupling post to urge the outlet flange toward the inlet flange.

12. The clamp according to claim 9 wherein the anti-rotation assembly device is configured such that applied force against the torque application device results in rotation of the clamp such that the anti-rotation assembly device urges the outlet flange toward the inlet flange.

13. The clamp according to claim 12 wherein each of the first and second coupling posts comprises an angled side and the anti-rotation assembly device comprises a pair of tabs each comprising an angled edge configured to engage the angled side of the corresponding coupling post to urge the outlet flange toward the inlet flange in response to applied force against the torque application device.

14. The clamp according to claim 9 wherein the ring body is configured to surround the raised-rim of the outlet flange and the raised-rim of the inlet flange to clampingly retain the outlet flange in coupled engagement with the inlet flange.

15. The clamp according to claim 14 wherein the ring body comprises a main body portion and a pair of inwardly-turned edges together defining a generally V-shaped cross-section.

16. The clamp according to claim 15 wherein the V-shaped cross-section is configured to be complementary to a cross-section of the raised-rims of the outlet flange and the inlet flange.

17. An anti-rotation and assembly aid clamp for use in coupling a turbocharger and a catalytic converter, the turbocharger having an outlet flange with a raised-rim and a first coupling post having an angled side, the catalytic converter having an inlet flange with a raised-rim and a second coupling post having an angled side, the inlet flange being sized and shaped to be complementary to the outlet flange, the clamp comprising:
- a V-shaped ring body configured to circumferentially clamp the outlet flange to the inlet flange via a compressive force, the ring body is configured to surround the raised-rim of the outlet flange and the raised-rim of the inlet flange to retain the outlet flange in coupled engagement with inlet flange;
- a torque application device configured to apply the compressive force to the ring body; and
- an anti-rotation assembly device having a pair of tabs each comprising an angled edge configured to engage the angled side of the corresponding coupling post to urge the outlet flange toward the inlet flange.

18. The clamp according to claim 17 wherein the pair of tabs of the anti-rotation assembly device is configured such that applied force against the torque application device results in rotation of the pair of tabs such that the anti-rotation assembly device urges the outlet flange toward the inlet flange.

* * * * *